(12) United States Patent
Walters

(10) Patent No.: US 8,182,184 B1
(45) Date of Patent: May 22, 2012

(54) SPRING LOADED GEAR BOLT ASSEMBLY AND METHOD

(75) Inventor: James C. Walters, Cresson, TX (US)

(73) Assignee: Williams-Pyro, Inc., Fort Worth, TX (US)

( * ) Notice: Subject to any disclaimer, the term of this patent is extended or adjusted under 35 U.S.C. 154(b) by 662 days.

(21) Appl. No.: 12/328,765

(22) Filed: Dec. 5, 2008

(51) Int. Cl.
*F16B 35/00* (2006.01)
*H01R 13/62* (2006.01)

(52) U.S. Cl. .................. 411/383; 411/402; 439/362

(58) Field of Classification Search .............. 411/386, 411/347, 383, 384, 402; 439/362–365
See application file for complete search history.

(56) References Cited

U.S. PATENT DOCUMENTS

| | | | | |
|---|---|---|---|---|
| 3,201,743 A | * | 8/1965 | Huber et al. | 439/365 |
| 3,528,466 A | * | 9/1970 | Tracy | 81/431 |
| 4,284,315 A | | 8/1981 | Williams | |
| 4,340,789 A | | 7/1982 | Williams | |
| 4,685,848 A | * | 8/1987 | Langer | 411/402 |
| 4,997,305 A | * | 3/1991 | Yang | 403/322.3 |
| 5,098,312 A | * | 3/1992 | Raczynski | 439/362 |
| 5,213,532 A | * | 5/1993 | Mee | 439/364 |
| 5,383,795 A | * | 1/1995 | Falossi et al. | 439/362 |
| 5,411,401 A | * | 5/1995 | Chiou | 439/76.1 |
| 6,406,315 B1 | * | 6/2002 | Bates et al. | 439/310 |
| 6,948,966 B2 | * | 9/2005 | Kambayashi et al. | 439/362 |

* cited by examiner

*Primary Examiner* — Flemming Saether
(74) *Attorney, Agent, or Firm* — Morani Patent Law, PC

(57) ABSTRACT

Repeated inserting, tightening, loosening, and removing of external threads to internal threads can increase the likelihood of cross threading and thread damage. A spring loaded gear bolt assembly, which promotes alignment of mating threads before applying torque, is described. A spring is disposed on the back end of a bolt shaft to promote alignment of lead mating threads before twisting to engage external to internal threads. A gear chain translates a single hand rotation to thread two bolts into respective affixed internal threaded holes, simultaneously. A spring loaded gear bolt assembly and method described herein promote increased thread life and ease of use ease for test plate securing. Efficient single handed manipulation of multiple bolts simultaneously can be achieved using a test plate assembly, which included spring loaded gear bolt assemblies, as described herein. Applications of a spring loaded gear bolt include infrared adapter test plate assemblies.

8 Claims, 7 Drawing Sheets

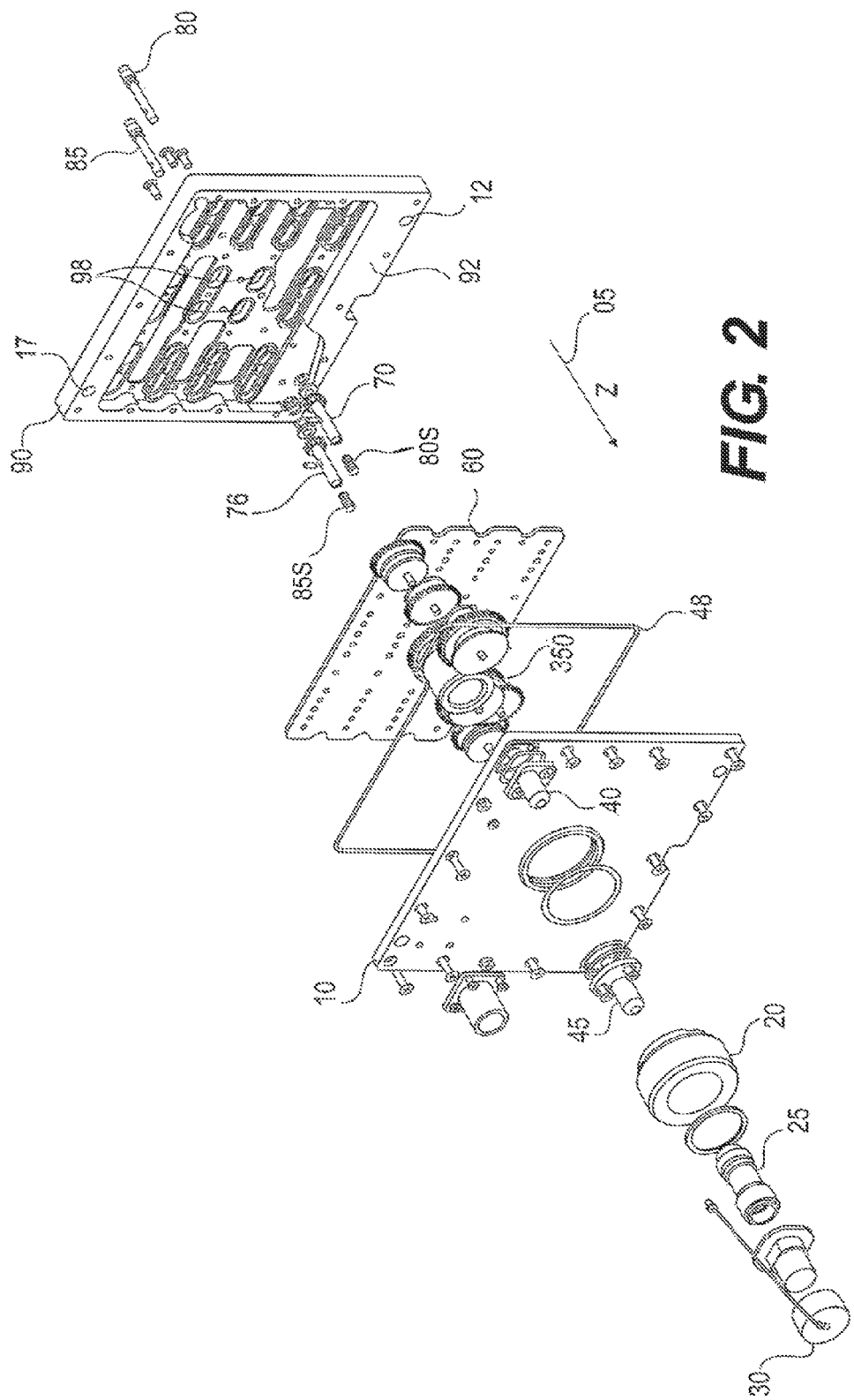

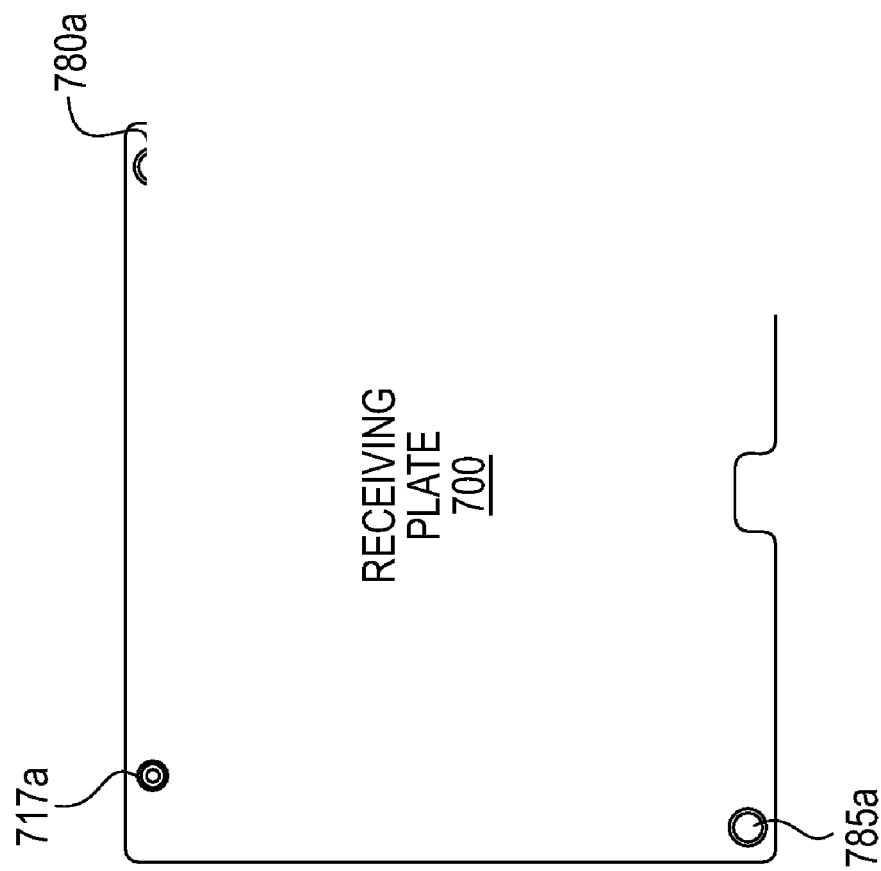

SPRING LOADED GEAR BOLT ASSEMBLY AND METHOD

BACKGROUND OF THE INVENTION

The present invention relates generally to preventing thread damage across pairs of external bolt threads and internal mating threads. Thread damage is an ongoing challenge in bolt fastening applications. Numerous factors can contribute to thread damage. Repeated fastening and unfastening may add to the opportunity for damaging threads. Cross threading can lead to fastener failure. Different bolt applications and configurations can present additional challenges for potential cross threading as compared with a conventional straight on bolt and nut application.

It would be desirable to provide a method and system which promoted alignment of external bolt threads and internal mating threads to preserve external and internal threads.

SUMMARY OF THE INVENTION

The present invention addresses the issue of thread preservation in securing or fastening applications across external bolt threads and internal affixed. The present invention provides a spring loaded gear bolt assembly which protects lead threads and affords aligning the male and female threads before engaging mating threads. A test plate assembly comprising spring loaded gear bolt assemblies, in accordance with the present invention, permits simultaneous alignment of multiple sets of bolt threads and affixed internal threads with a single-handed operation. Certain aspects of the present invention are briefly described below but are not exhaustive. Further, any one embodiment in accordance with the present invention may include any of the certain aspects described below.

One aspect of the present invention is that it may be incorporated into a test plate assembly.

Another aspect of the present invention is that affords alignment of lead threads before application of torque upon the threads.

Another aspect of the present invention is that it promotes on axis contact of lead threads despite an off axis application of insertion force; and further, another aspect of the present invention is that it facilitates axial thread alignment despite the application of torque at an off axis point and the application of torque upon a bolt shaft at less than the bolt circumference.

Another aspect of the present invention is its ready incorporation into a single handed test plate mounting assembly.

Another aspect of the present invention is that the aligning force can be varied as needed for the application requirements.

Another aspect of the present invention is that the displacement afforded by the aligning force can be varied.

Another aspect of the present invention is that the aligning force and displacement can be varied independently.

Another aspect of the present invention is the binding-free mounting of a test plate assembly to an affixed assembly, which is afforded in part by spring loading, in accordance with an embodiment of the present invention.

Yet another aspect of the present invention is the relative hardness of parts in the gear bolt assembly, to preserve the gear bolt assembly as well as the lead threads on the bolt and in the mounting plate.

An aspect of the present invention is a decreased potential for cross threading; embodiments enable seating of the bolt evenly before turning to translate male threads of bolt shaft into female threads of affixed receptor, which decreases the chances of cross threading.

Another aspect of the present invention is the protection of threads during insertion and securing of multiple bolts simultaneously with a single hand.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein:

FIG. 2 shows an exploded view of a test plate assembly which employs a gear bolt assembly, in accordance with an embodiment of the present invention;

FIG. 7 shows a front view of an exemplary receiving plate, to which an embodiment of a test plate assembly in accordance with the present invention, may be attached.

DETAILED DESCRIPTION OF THE INVENTION

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are merely illustrative of ways to make and use the invention, and do not limit the scope of the invention. Element Reference numbers in the figures are consistent across figures, when possible. Parts are not necessarily identical across figures and are not necessarily consistent across embodiments.

Figure 1D:
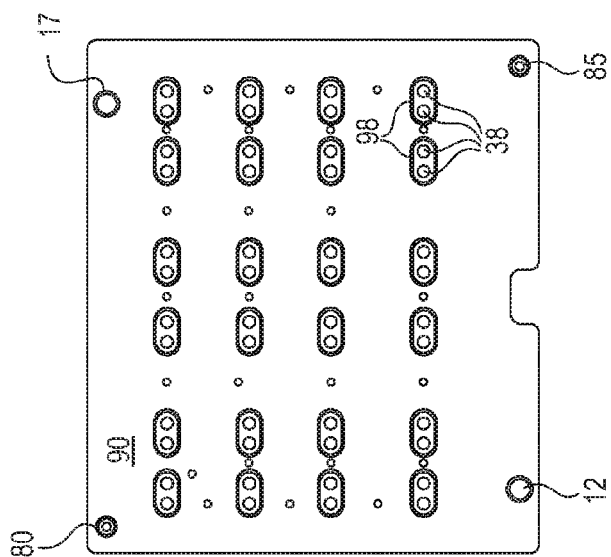
FIGS. 1A-1D show a top view, side view, front isometric view, and a back view, respectively, of an embodiment of a test plate assembly utilizing a gear bolt assembly, in accordance with an embodiment of the present invention; sent invention
Figure 1B:
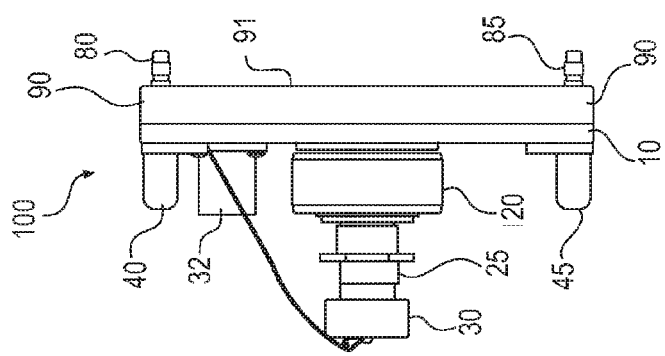
Figure 1A:
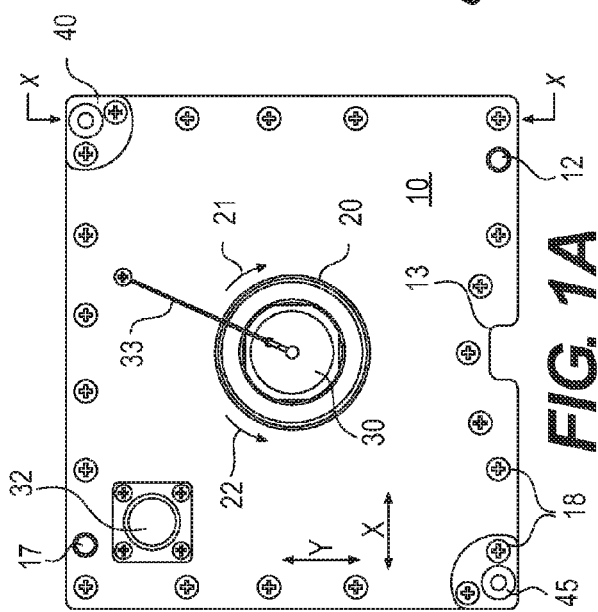

FIGS. 1A-1D show a top view, side view, front isometric view, and a back view, respectively, of an embodiment of a test plate assembly utilizing a gear bolt assembly in accordance with an embodiment of the present invention. FIG. 1A shows a top view of a face plate of a test plate assembly, in accordance with an embodiment of the present invention. Centered in the face plate 110 is grip 120. A user will rotate grip 120 clockwise 121 to secure the test plate assembly 100, shown in FIG. 1B to the mounted receiving plate. And conversely, rotating grip 120 counter-clockwise 122 will loosen the test plate assembly 100 for removal. In FIG. 1A, dust cap 130 is shown secured to the adapter, not shown, while a dust cap holder 132 is within tether 133 distance for ready storage during testing.

FIG. 1B shows a side view of a closed test plate assembly 100 in accordance with an embodiment of the present invention. Adapter 125 provides electrical connections for the desired voltage tests. Spring housings 140, 145 extend outward from the face plate 110 on which they are mounted. As shown in FIG. 1A, spring housings 140, 145 are at the lower left and upper right corners of the face plate 110. For example, the depth of the adapter 125, grip 120 and spring housings 140, 145 may not be shown to scale. And these elements, for example, can vary in diameter and depth as desired in accordance with an exemplary embodiment of the present invention. Similarly, the height of the dust cap holder can vary and may be threaded.

FIG. 1A shows the spring housing secured to the face plate 10 via a pair of screws 18. Additional screws 18 secure the face plate 10 to the back plate 90, where back plate 90 is shown in side view FIG. 1B.

Figure 1C:
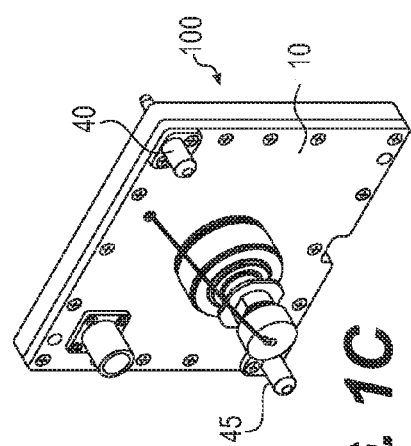

In diagonal corners opposite the spring housings 45, 40 are aligning pin holes 12, 17, which extend through both the face plate 10 and the back plate 90, as shown in FIGS. 1A and 1C. The aligning pins, not shown, are affixed to the receiving plate. The receiving plate, not shown, houses the pins or other connection types to be tested.

FIG. 1C shows a front isometric view of spring housings 40, 45 adapter 25, and grip 20, and their relative positions on face plate 10. FIG. 1C also provides a perspective view of aligning pin holes 17, 12 on a first diagonal and the spring housings 40, 45 on a second diagonal. Bolt shafts 80, 85 extend out the back side 91 of back plate 90. Turning to FIG. 1D, contact pin pads 38 extend through openings 98 in the back plate 90. Bolt shafts 85, 80 extend through the back plate as well.

Figure 3B:
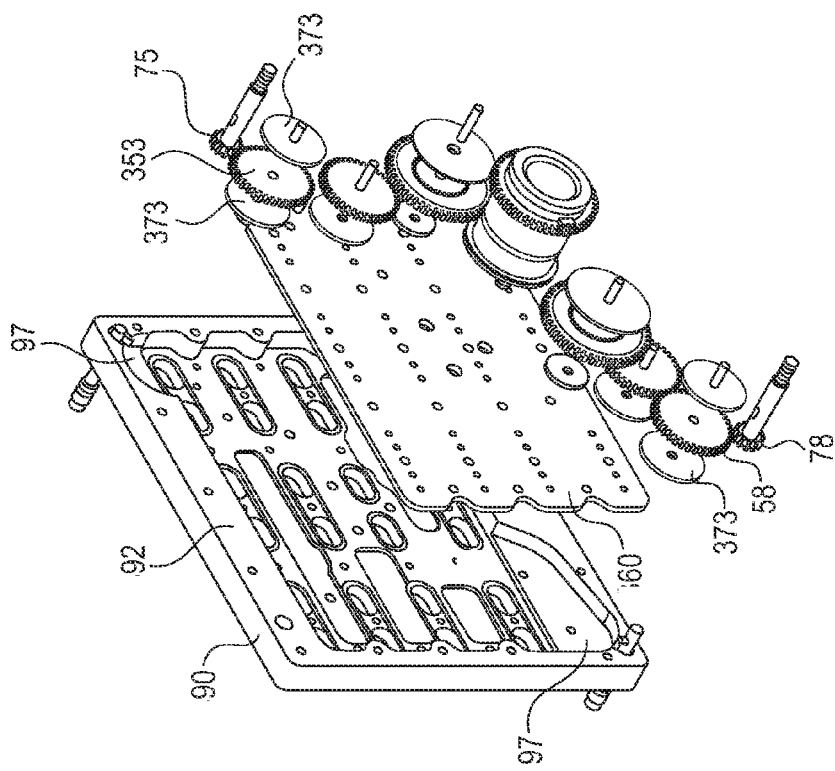
FIGS. 3A-3B shows a perspective view of the gear plane and an exploded view of the same, respectively, in accordance with the present invention.
Figure 3A:
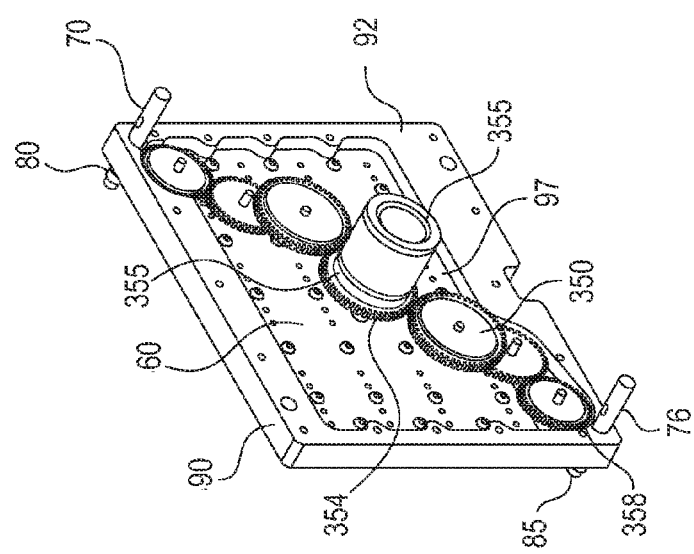

FIG. 2 shows an exploded perspective view of the test plate assembly 100. The inside 92 of the back plate 90 faces the back of circuit board 60. The gear chain 350 rests atop circuit board 60, which is disposed between the face plate 10 and the back plate 90. FIGS. 3A-3B show the gear chain and its relation to the gear housing 70, 76 in greater detail. Bolt shafts 80, 85 extend through back plate 90 before entering respective gear housings 70, 76. Inserted in gear housings 70, 76 are respective springs 80S, 85S. The gear housing and bolt shaft are shown in greater detail in FIG. 4. Gear housings 70, 76 extend from the gear chain 350 through face plate 10. Spring housings 40, 45 cover the portion of the respective gear housing, which extends out of the face plate 210, and in which respective springs 80S, 85S are housed. The user grip 20 is mounted on the face plate 10 and is used by a user to secure and remove the test plate assembly, 100 from the receiving plate, not shown. Also shown extending from the front of the face plate is adapter 25, which is capped by dust cap 30.

In accordance with an exemplary embodiment of the present invention in ensemble of o-rings is used throughout the test plate assembly to withstand salt water and other corrosive environments. O-ring 48 frames circuit board 60 and is disposed between face plate 10 and back plate 90.

FIG. 3A shows a perspective view of the gear chain 350, which is housed between face plate 10 and the back plate 90, and just above the circuit board 60. Circuit board 60 is disposed inside a large recess 97 of the inside 92 of back plate 90. Gear housings 70, 76 are shown extending out of inner sides 92 back plate 90, whilst bolt shafts 80, 85 extend out the opposite side 91 of the back plate 90. Stem 355 engages, is connected to, center gear 354, which connects the grip (not shown) to the gear chain 350. In accordance with an exemplary embodiment, an over torque clutch is disposed between the grip and gear housing, to prevent over torque on the threads of the bolt shaft.

FIG. 3B is an exploded view of the gear chain 350 and circuit board 60 in the back plate 90. End gears 358, 353 engage the respective gears 75, 78 on the gear housings 70, 76. Gears in the gear chain rest between spacers 373, separating the gear from the circuit board surface 60. The gear chain 350 rests in the recess 97 of the back plate 90. The gear 75, 78 of respective gear housing 70, 76 are also set into a recess 97 of back plate 90, and rest on a respective spacer, not shown. The number of gears in the gear chain 350 and relative ratios may vary across embodiments, as desired or as space and load requirements dictate.

Figure 4:
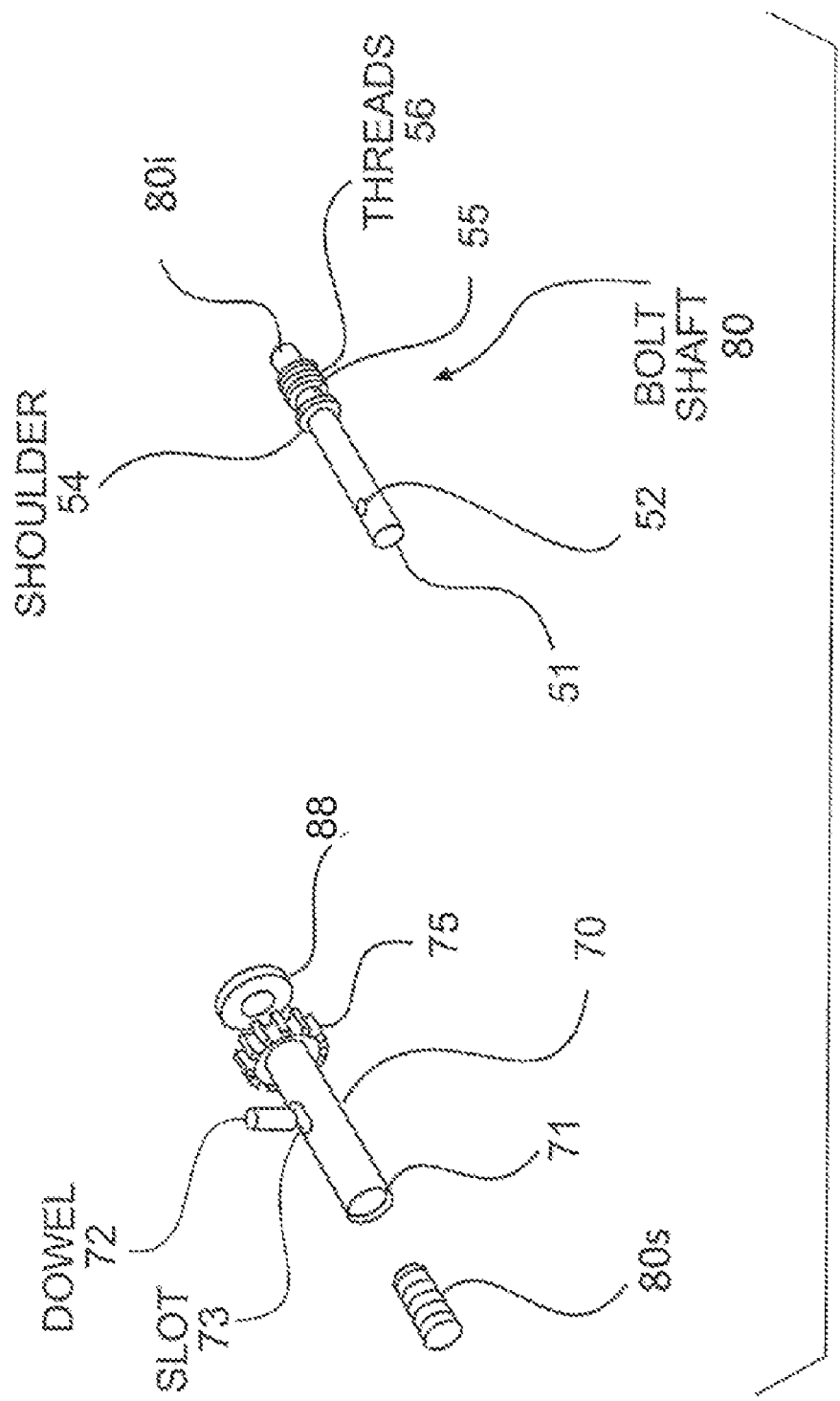
FIG. 4 shows a drawing of an exemplary gear bolt assembly in accordance with an embodiment of the present invention.

FIG. 4 shows a detailed view of a gear bolt assembly 400, in accordance with an exemplary embodiment of the present invention. Bolt shaft 480 has a thread-less insertion lead 460 with an outer diameter that is just less than the minor diameter of the internal threads in the receiving plate. The diameter of the thread-less insertion section 460 is also less than the minor diameter of the threaded bolt section 456. The thread-less insert section backs up to the threaded portion 456 of the bolt shaft 450. In accordance with the exemplary embodiment of FIG. 4, the total threaded length is 0.20 inches. In alternate embodiments the thread length can be longer or shorter as desired or as needed to withstand the resultant load. According to one exemplary embodiment, the bolt shaft is under tensile load when bolted into the receiving plate. In alternate embodiments, the parameters, such as, pitch, major axis, minor axis, thread height, and thread length of the bolt shaft can vary as desired or as needed to meet application requirements. The material of the bolt shaft or threads can also vary.

A thread-less section 455 follows the threads 456. The thread-less section 455 has an outer diameter less than the minor diameter of the threads 456. Next to the thread-less section 455 is a displacement limiting shoulder section 454. Referring to FIG. 2, back plate 290 has through-holes in diagonal corners through which bolt shafts 280, 285 pass, where an exemplary bolt shaft is shown as 450 in FIG. 4. The upper end, or head end, 452 of bolt shaft 450 inserts into gear housing 470. Bolt shaft 450 inserts into gear housing 470, which has a spring end 471 and a gear and 475. Gear housing 470 has an inner diameter which affords ready insertion of the bolt shaft 450.

Bolt shaft 450 has a through hole 452 which is aligned with through slot 473 in the gear housing. Dowel 472 passes through the top slot 473 and hole 452 and out the bottom slot, not shown, of the gear housing. The distance of hole 452 to the head 451 of the bolt shaft is less than the distance of the slot to the 471 end of the gear housing 470. After insertion of the bolt shaft into the gear housing and after insertion of dowel 472 through the slot 473 and whole 452, there is empty headspace in gear housing 470. Spring 480 inserts, at least partially, into gear housing 470. The outer diameter of spring 480 fits easily into the diameter of the gear housing and rests against the head of the bolt 451.

Figure 5:
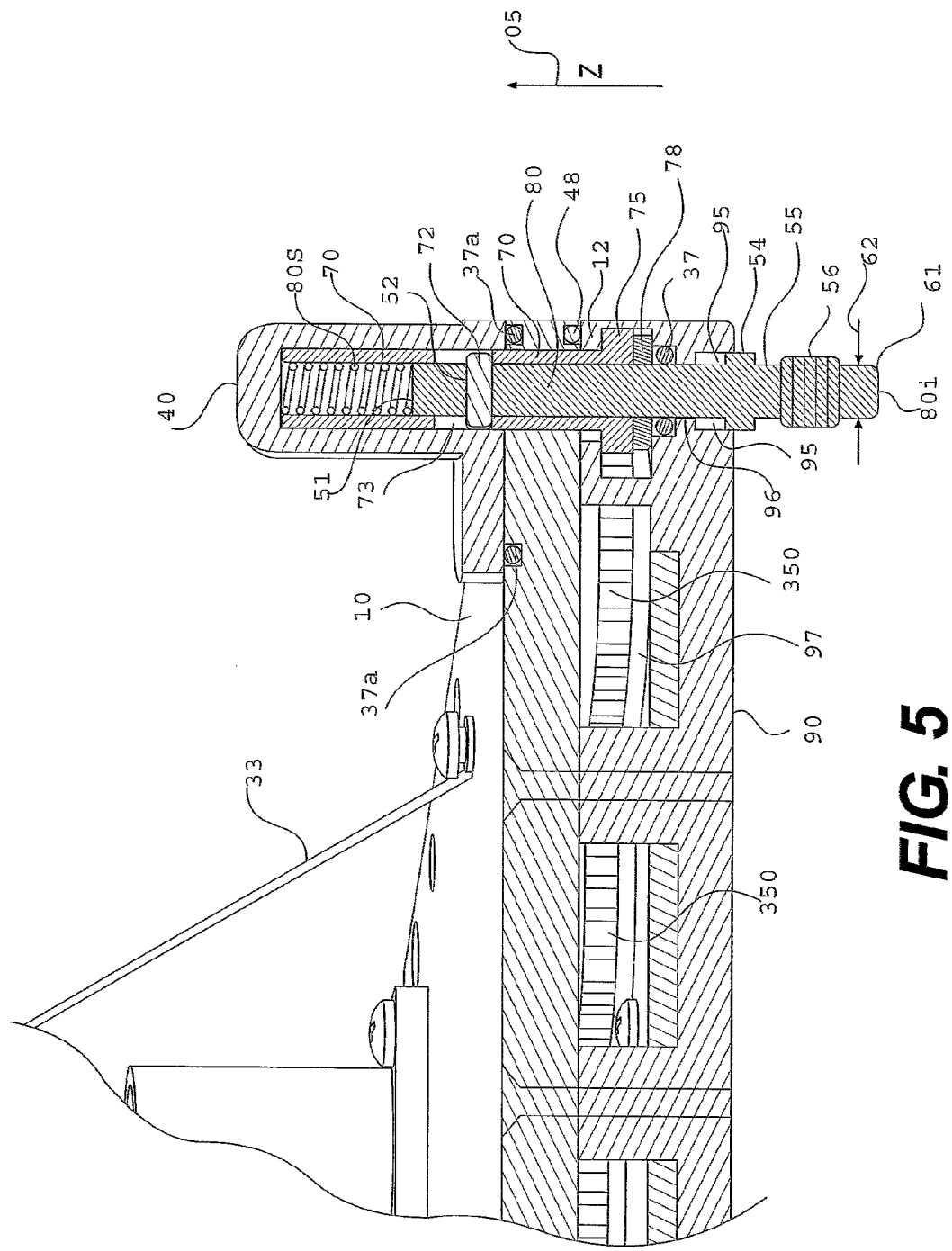
FIG. 5 shows a cross section of a solid rendering of a test plate assembly, along line X-X FIG. 1A.

FIG. 5 shows a cross section of a gear bolt assembly as disposed in a test plate assembly, in accordance with an embodiment of the present invention, along line X-X of FIG. 1A. When the gear bolt assembly is mounted in a test plate assembly 500, spring housing 540 fits over the head end of gear housing 570 and any spring portion 580 which extends past the housing 570. Dowel 572 has an outer diameter which affords ready displacement along the gear housing axis riding in the slot 573. In accordance with one exemplary embodiment the slot 573 permits $1/10$ of an inch displacement of the bolt shaft relative to the gear housing. A method of securing a test plate assembly 500 to receiving plate and a method of assembling a spring-loaded gear bolt assembly are described in reference to FIG. 5.

In accordance with the present invention, an exemplary embodiment of a spring loaded gear bolt assembly comprises: a spring 580 580s; a spring housing 540; a gear housing 570 with slot 573 and gear 575; a bolt shaft 550 with a through hole 553, a shoulder 554, a threaded section 556, and an insert section 560; and a dowel 572. Bolt shaft 550 inserts through opening in the back plate 590 and into gear housing 570. Gear 575 of gear housing 570 rests in a recess 597 of back plate 590 while the head-end of gear housing 570 extends through face plate 510. Disposed in the head end of the gear housing 570 and resting on the head end of bolt shaft 550 is spring 580 580s. Atop spring 580 and surrounding the portion of the gear housing, which extends past the face plate 510, is spring housing 540.

In accordance with an exemplary embodiment, insertion section 560 has radiused edges 561 and an outer diameter 562, which is less than the minor diameter of internal receiving threads affixed in a receiving plate. An exemplary receiving plate is shown in FIG, 7. A receiving plate, to which a test plate assembly in accordance with an embodiment of the present invention may be secured, may be an infrared adapter receiving plate. The infrared adapter receiving plate may be affixed on an aircraft, manned or unmanned, for which flare deployment is desired. Further, while embodiments of the present invention are described, for example in FIGS. 1-5, in relation to an infrared adapter, or infrared decoy flare receiving plate, a test plate assembly and spring loaded gear bolt assembly in accordance with the present invention can be modified and employed to other types of receiving plates. For example, a chaff, or electronic counter measure, receiving plate can be affixed to any aircraft and a test plate assembly housing a spring loaded gear bolt assembly, in accordance with an exemplary embodiment of the present invention, may be secured thereto for testing purposes. The placement of the spring loaded gear bolt assembly within the test plate assembly can be varied to align with affixed internal receiving threads, and the dimensions, e.g. frontal plane dimensions, of the test plate assembly can be varied as needed or desired to mount to a specific receiving plate.

FIG. 7 does not show electrical contact pins of the receiving plate, which may align with some or all of contact pads 38, shown in FIG. 1D. The number and placement of contact pads 38 in a test plate assembly, in accordance with the present invention, may also vary as desired or needed to correspond with electrical contacts in a receiving plate. FIG. 7 shows affixed internal threads 785a, 780a into which the bolts 80, 85 (FIG. 1) will thread. In opposite corners, corresponding to the exemplary embodiment of FIGS. 1A-1D, pins 712a and 717a correspond to through holes 17 and 12 (FIGS. 1A and 1D).

After placing the gear housing 570 into recess 597 and after placing additional intermediate parts, such as the gear chain 565 and the circuit board, not shown, the face plate 510 and back plate 590 can be secured together. The bolt shaft 550 can be inserted through opening 596 and secured in the gear housing by aligning the hole 553 of bolt shaft 550 with the slot 573 of the gear housing 570 and inserting the dowel 572, as shown in FIG. 5. In accordance with the embodiment of FIG. 5, gear 575 rests on a washer 578 at its gear end 575 and up against spring housing 540 on its other end, fixing, at least in part, the position of the gear housing in the Z direction 505. With a spring 580s placed into the head end of the gear housing 570, the spring housing 540 can enclose the spring 580s and the exposed end of the gear housing 570 and can be secured to face plate 510.

Once the test plate assembly 500 is assembled it can be secured to the receiving plate. In accordance with one exemplary embodiment, the receiving plate is a flare loading plate, which is affixed to, for example, an aircraft. In accordance with the present invention, single handed mounting, securing, and removing are enabled. Referring to FIG. 1B, grip 120 can be used to align the holes 112 and 117 to the receiving plate pins 712a, 717a (FIG. 7). Additionally, a notch 113 may be present and aligned on a receiving bar or channel lock. The inserting end 560 of bolt shaft, FIG. 5, will align with corresponding internal threaded holes in the receiving plate. Centering the single handed grip 130, FIG. 1A, on the face plate 110 ergonomically favors balance across the test plate assembly 100 in both frontal plane directions x and y. According to one exemplary embodiment, the spring constant of spring 580 (FIG. 5) is one pound. When the insertion end of the bolt shaft 560 (FIG. 5) acquires an impacting force of one pound or greater, the bolt shaft 550 will displace along its axis as afforded by slot 573 and space 595. This axial displacement will enable the lead external threads 556 to align with corresponding lead internal threads on the receiving plate. By compressing the spring and evenly seating the mating threads before rotating the grip, the likelihood of cross threading is reduced. Even with repeated securing and removal of the test plate assembly 500 to a receiving plate, threads 556 are preserved and protected. Further, this protection is provided to two spatially separated bolts simultaneously during the simultaneous securing of said two bolts from a single site of torque application, which is a user grip. Single handed securing and removing of a test plate assembly into a receiving plate is afforded by the present invention, while enabling alignment of threads before engaging and loading external and internal threads of two respective bolts.

In yet other embodiments, additional gear bolt assemblies can be employed. Possible configurations include a gear chain running across the opposite diagonal, referring to FIG. 3A. In another embodiment, the circuit board 60 (FIG. 2) can be displaced from the gear chain. For example a gear chain plate could be disposed on the face plate side of circuit board.

Referring to FIG. 1D, contact pads 38, which are distributed across the face of the back plate, will depress corresponding pin contacts of the receiving plate when the test plate assembly is secured to the receiving plate. In accordance with one exemplary embodiment, thirty pounds of pressure are applied via the contact pads to depress the army of contact pins on the receiving plate. The desired electrical connection is provided from the receiving plate pins to adapter 25 (FIG. 1B) for testing. In alternate embodiments, the form of electrical connections between the receiving plate and the test plate assembly can vary as desired or as needed in accordance with the configuration of the receiving plate.

As described above, the present invention affords simultaneous alignment and subsequent securing of two bolts using a single handed operation. Additional gear bolt assemblies can be employed at additional places along the gear chain. The gear chain can be expanded or shortened in length. Similarly a gear chain running in the opposite direction, or another direction can be employed. Displacing the circuit board from the gear chain would afford multiple center gear, gear chain, to gear housing configurations. A single gear, e.g. a large gear at center gear 354 position, may replace the gear chain 350 to provide connection to gear end of gear housings 78, 75 (FIGS. 3A and 3B), placed about the circumference of the single gear. Additional gear housings can be positioned along the circumference of the single gear as needed for load accommodation or receiving plate configuration.

In accordance with an exemplary embodiment, for example as shown in FIGS. 1A-1D, aligning pins on the receiving plate 717a, 712a are provided to assist in aligning the connection of the test plate assembly with the receiving plate. The translation afforded by space 95 and slot 73 (FIG. 5) may lessen binding of the test plate assembly on the pins during insertion. The binding-free, or reduced binding, mounting of a test plate assembly to an affixed receiving plate assembly is afforded in part by spring loading, in accordance with an embodiment of the present invention. The binding reduction can be adjusted by respective spring constants and by the number of springs employed, where a spring 80S is comprised in a gear bolt assembly, shown for example in FIGS. 5 and 4.

Another aspect of the present invention is that the aligning force can be varied as needed for the application requirements. The aligning force can be adjusted by the choice of spring used in the gear bolt assembly. Another aspect of the present invention is that the displacement afforded by the aligning force can be varied. The displacement obtained in response to the applied aligning force can be adjusted by, for example, by the length of slot 73 and the depth of recess 95. In turn, in accordance with embodiments of the present invention, the aligning force and displacement can be varied independently.

Figure 6A:
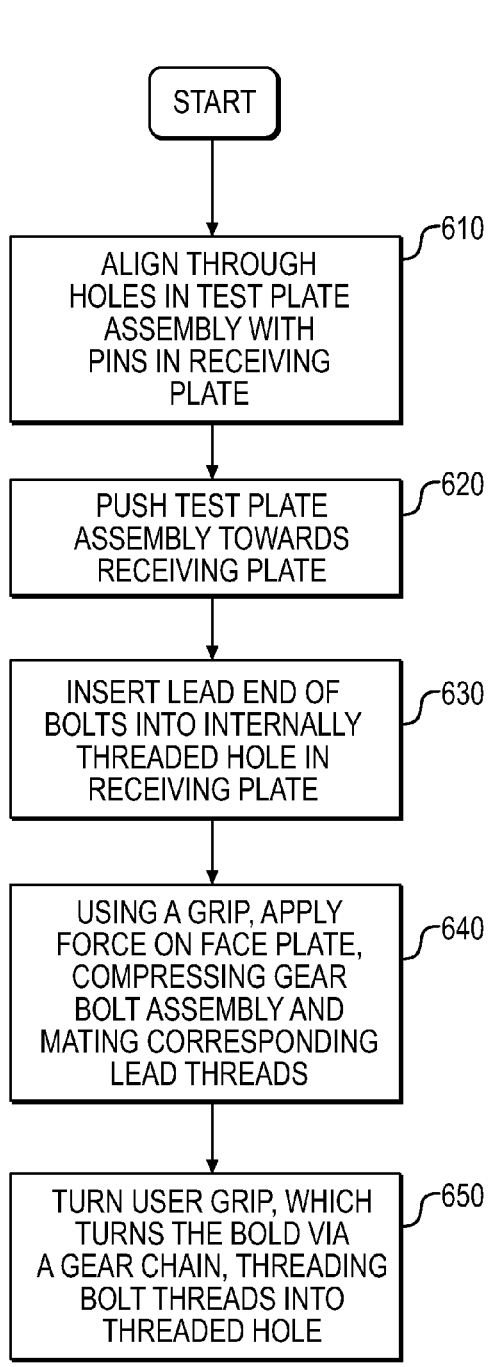
FIGS. 6A-6B shows a block diagram of a method of securing a test plate assembly to an affixed receiving plate and a method of aligning at least two sets of lead external bolt shaft threads and affixed internal mating threads mounted in a receiving plate, respectively.

FIG. 6A shows a block diagram of a method of securing a test plate assembly to an affixed receiving plate. Through holes in a test plate assembly are aligned with pins in a receiving plate 610. The test plate assembly is pushed towards the receiving plate 620. The lead end of at least one bolt is inserted into a corresponding internally threaded hole in the receiving plate 630. Using a user grip, the user pushes on a face plate of the test plate assembly, which compresses a spring within the spring loaded gear bolt assembly and mates the corresponding lead threads 640. Once the spring loaded gear bolt assembly compresses, the user may turn the user grip which will apply a torque on the bolt shaft, threading the external bolt threads into the internal threads 650.

Figure 6B:
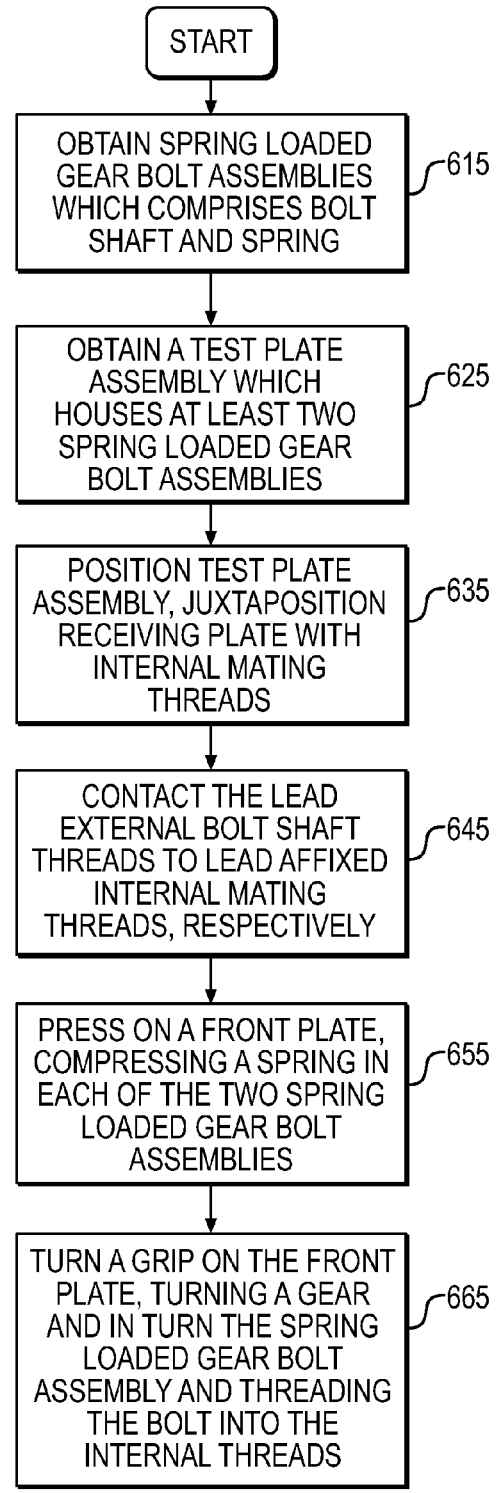

FIG. 6B shows a block diagram of a method of simultaneously aligning at least two sets of lead external bolt shaft threads and affixed internal mating threads mounted in a receiving plate. A user first obtains spring loaded gear bolt assemblies 615 and a test plate assembly which housed at least two spring loaded gear bolt assemblies 625. The user positions the test plate assembly juxtaposition the receiving plate with internal mating threads 635. Contact is made between lead external threads and corresponding internal threads in the receiving plate 645. Pressing on the front plate of the test plate assembly, compresses a spring in respective spring loaded gear bolt assemblies, displacing the at least two bolt shafts normal to the receiving plate aligning mating threads axially 655. Then, turning a user grip on the front plate of the test plate assembly will apply a torque on the bolt shaft, threading the external threads into the mated internal threads of the receiving plate.

The present invention enables inserting and threading of two bolt shafts simultaneously with one hand, while aligning respective lead threads before torque application, which decreases the potential for cross threading, wherein the bolt threads are machine threads not designed to cut. While specific alternatives to steps or elements of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawings.

What is claimed is:

1. A spring loaded gear bolt assembly, the assembly compromising:
    a bolt shaft, which extends into a gear housing;
    a gear housing connected to the bolt shaft;
    a spring, which provides a load on the bolt shaft;
    a spring housing, which provides the opposing surface for spring compression when the bolt shaft is displaced; and
    wherein: the spring extends into the gear housing and the gear housing extends into the spring housing.

2. A test plate assembly, the assembly comprising:
    a spring loaded gear bolt assembly, the spring loaded gear bolt assembly comprising:
        a bolt shaft, which extends into a gear housing;
        the gear housing connected to the bolt shaft;
        a spring, which provides a load on the bolt shaft; and
        a spring housing, which provides the opposing surface for spring compression when the bolt shaft is displaced;
    a back plate, which connects to a receiving plate for testing;
    a face plate, which connects to the back plate;
    a gear chain disposed between the back plate and the face plate, which is connected to a user grip and to a gear on the gear housing;
    wherein the user grip is mounted on the face plate;
    wherein the spring housing is mounted on the face plate; and
    wherein the bolt shaft extends through the back plate and the gear housing extends through face plate and into the spring housing.

3. The test plate assembly according to claim 2, the assembly further comprising:
    a recess in a back side in the back plate for receiving a shoulder, which is integral to and behind a threaded portion on the bolt shaft.

4. The test plate assembly according to claim 2, the assembly further comprising:
    at least two spring loaded gear bolt assemblies.

5. The test plate assembly according to claim 2, wherein a gear provides the gear chain and is disposed between the back plate and the face plate and is connected to a user grip and to a gear on the gear housing.

6. The test plate assembly according to claim 2, further comprising:
    a circuit board, which is disposed between the face plate and the back plate and is electrically connected to an adapter mounted on the face plate.

7. The test plate assembly according to claim 6, further comprising:
    contact pads disposed on a back side of the back plate, which make electrical contact with pins on a receiving plate when the test plate assembly is secured to a receiving plate, and wherein the contact pads are electrically connected to the circuit board.

8. The test plate assembly according to claim 2, further comprising:
    at least two aligning through holes disposed in the test plate assembly.

* * * * *